(12) United States Patent
Koizumi et al.

(10) Patent No.: US 12,012,081 B2
(45) Date of Patent: Jun. 18, 2024

(54) BRAKE CONTROL APPARATUS

(71) Applicant: Hitachi Astemo, Ltd., Hitachinaka (JP)

(72) Inventors: Toshihiro Koizumi, Atsugi (JP); Chiharu Nakazawa, Kawasaki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 605 days.

(21) Appl. No.: 17/269,879

(22) PCT Filed: Jul. 4, 2019

(86) PCT No.: PCT/JP2019/026610
§ 371 (c)(1),
(2) Date: Feb. 19, 2021

(87) PCT Pub. No.: WO2020/039766
PCT Pub. Date: Feb. 27, 2020

(65) Prior Publication Data
US 2021/0179050 A1    Jun. 17, 2021

(30) Foreign Application Priority Data

Aug. 22, 2018   (JP) ................... 2018-155195

(51) Int. Cl.
*B60T 13/14* (2006.01)
*B60T 8/17* (2006.01)
(Continued)

(52) U.S. Cl.
CPC ............ *B60T 13/14* (2013.01); *F04B 1/053* (2013.01); *F04B 53/00* (2013.01); *F16C 17/02* (2013.01); *F16C 35/02* (2013.01); *B60T 8/17* (2013.01); *B60T 13/142* (2013.01); *B60T 13/58* (2013.01); *B60T 13/686* (2013.01); *B60T 2270/10* (2013.01); *B60T 2270/402* (2013.01); *B60T 2270/82* (2013.01)

(58) Field of Classification Search
CPC ........ B60T 13/14; B60T 13/58; B60T 13/142; B60T 8/17; B60T 13/686; B60T 2270/10; B60T 2270/402; B60T 2270/82; F04B 53/00; F04B 1/053; F16C 35/02; F16C 17/02
See application file for complete search history.

(56) References Cited

U.S. PATENT DOCUMENTS 6,065,816 A    5/2000  Nakazawa
11,111,914 B2*  9/2021  Choi ...................... B60T 17/02
(Continued)

FOREIGN PATENT DOCUMENTS

JP          10-81223 A      3/1998
JP        2008-179362 A     8/2008
(Continued)

OTHER PUBLICATIONS

JP H11247754 to Weh et al published on Sep. 14, 1999.*
(Continued)

*Primary Examiner* — Pamela Rodriguez
(74) *Attorney, Agent, or Firm* — Crowell & Moring LLP (57) ABSTRACT

A guide ring of a pump portion is fixed in a cylinder containing hole in such a manner that a distal end of a first end portion thereof is positioned in a cam containing hole on an upper side with respect to an opening edge of the cylinder containing hole.

14 Claims, 6 Drawing Sheets

(51) Int. Cl.
    *B60T 13/58*    (2006.01)
    *B60T 13/68*    (2006.01)
    *F04B 1/053*    (2020.01)
    *F04B 53/00*    (2006.01)
    *F16C 17/02*    (2006.01)
    *F16C 35/02*    (2006.01)

(56) References Cited

U.S. PATENT DOCUMENTS

2005/0253451 A1    11/2005    Hinz et al.
2018/0245573 A1    8/2018    Maruo et al.

FOREIGN PATENT DOCUMENTS

JP    2009-234399 A    10/2009
WO    WO 2017/056690 A1    4/2017

OTHER PUBLICATIONS

JP 2017124725 to Toshihiro published on Jul. 20, 2017.*
International Search Report (PCT/ISA/210) issued in PCT Application No. PCT/JP2019/026610 dated Oct. 8, 2019 with English translation (five (5) pages).
Japanese language Written Opinion (PCT/ISA/237) issued in PCT Application No. PCT/JP2019/026610 dated Oct. 8, 2019 with English translation (11 pages).

* cited by examiner

BRAKE CONTROL APPARATUS

TECHNICAL FIELD

The present invention relates to a brake control apparatus.

BACKGROUND ART

PTL 1 discloses a brake control apparatus including a plunger pump provided in a housing. A plunger of the plunger pump is contained in a cylinder containing hole of the housing, and extends into a cam chamber with the distal end portion thereof supported by a bearing.

CITATION LIST

Patent Literature

PTL 1: US Patent Application Public Disclosure No. 2005-0253451

SUMMARY OF INVENTION

Technical Problem

However, according to the brake control apparatus disclosed in the above-described patent literature, PTL 1, contamination staying in a gap between the inner peripheral surface of the cylinder containing hole and the outer peripheral surface of the plunger may scar the plunger by entering between the inner peripheral surface of the bearing and the outer peripheral surface of the plunger when the plunger is actuated, thereby resulting in a reduction in the durability of the plunger pump.

Solution to Problem

One of objects of the present invention is to provide a brake control apparatus capable of improving durability of a plunger pump.

According to one aspect of the present invention, a brake control apparatus includes a bearing through which a plunger is inserted. The bearing is fixed to a housing so as to protrude in an insertion hole or be arranged coplanarly with the insertion hole.

Advantageous Effects of Invention

Therefore, the brake control apparatus according to the one aspect of the present invention can improve the durability of the plunger pump.

DESCRIPTION OF EMBODIMENTS

First Embodiment

First, the configuration will be described.

Figure 1:
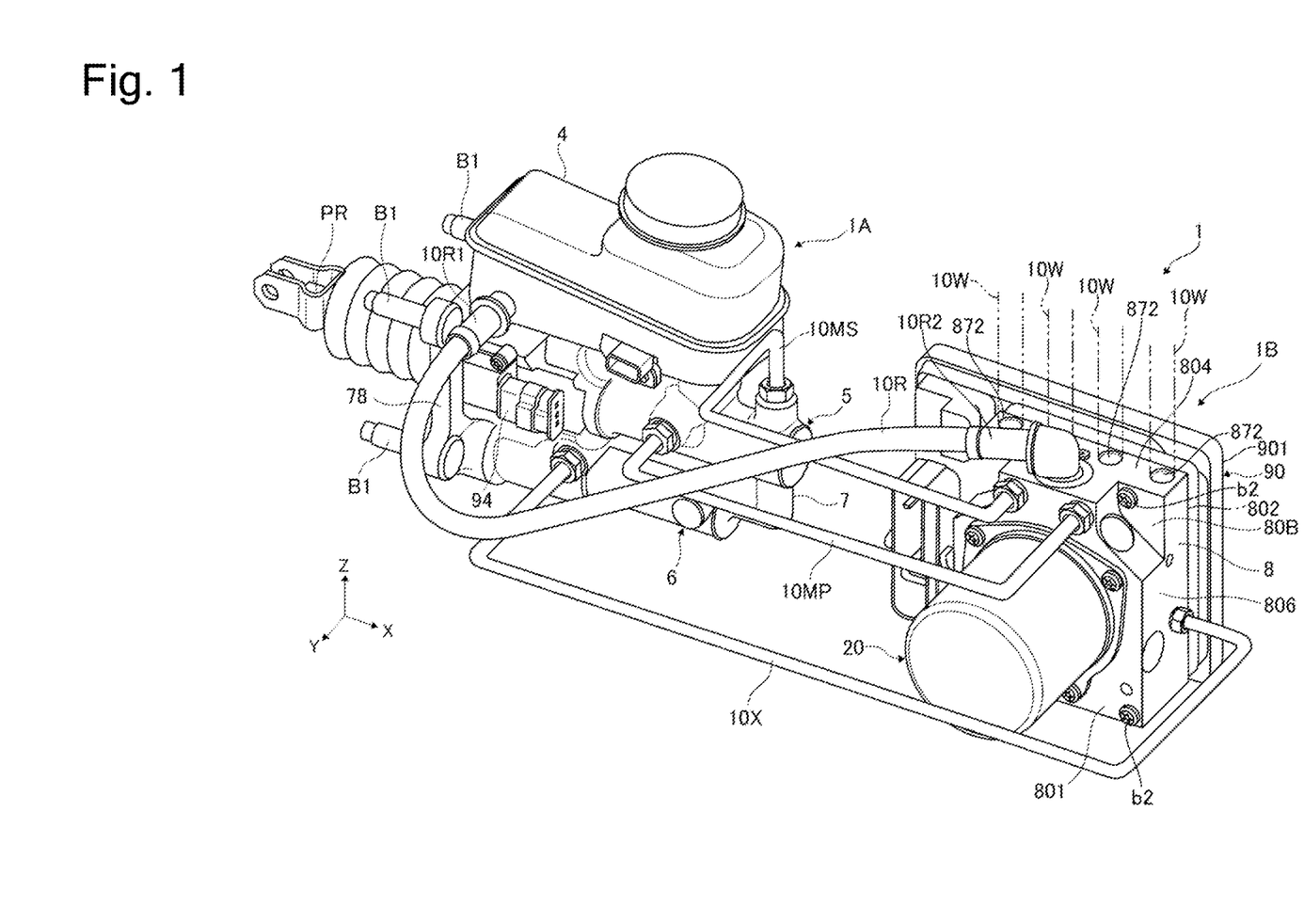
FIG. 1 is a perspective view of a brake control apparatus 1 according to a first embodiment.
Figure 2:
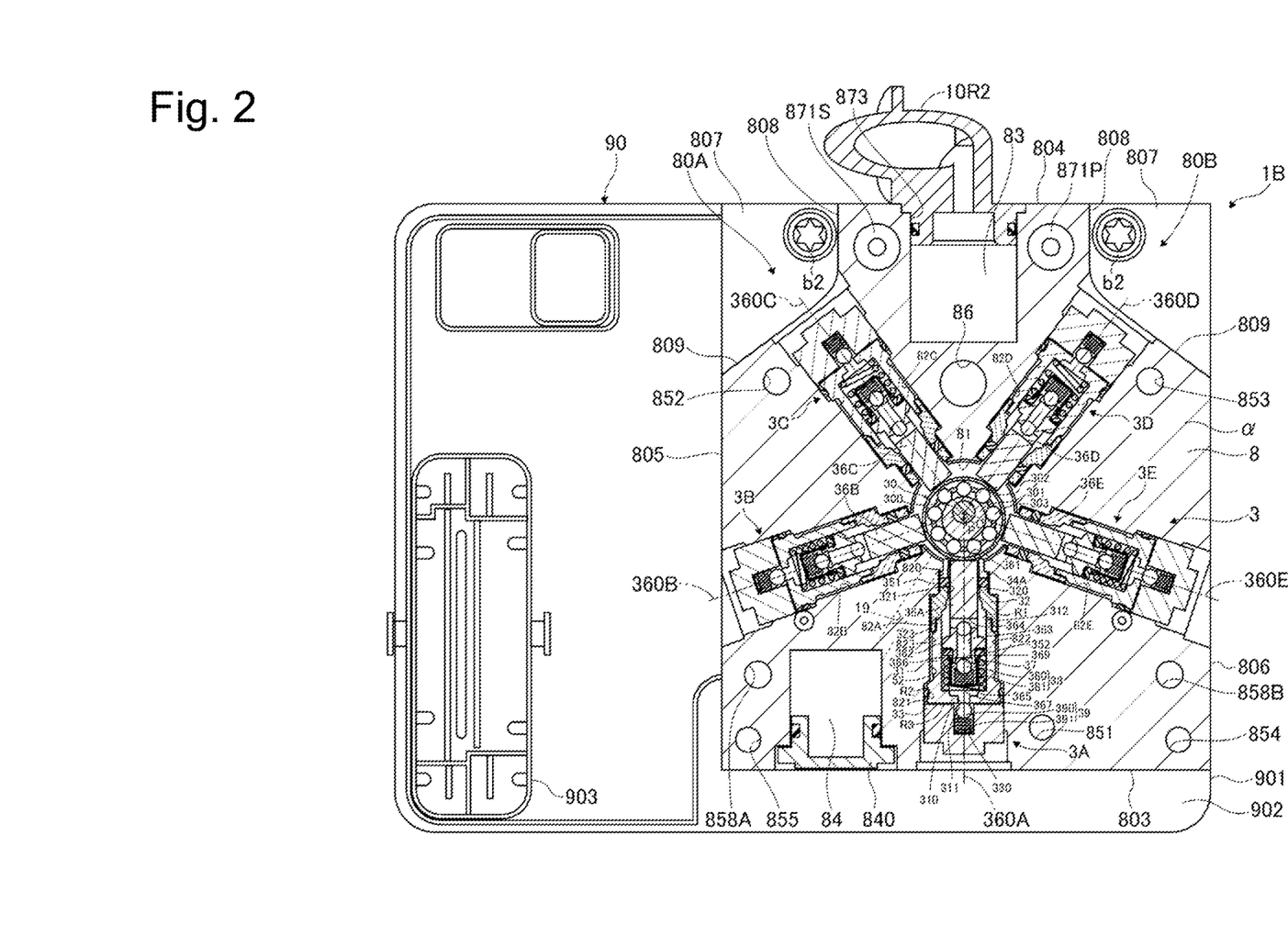
FIG. 2 is a cross-sectional view of a housing 8 of a second unit 1B according to the first embodiment taken along a direction perpendicular to an axis.

FIG. 1 is a perspective view of a brake control apparatus 1 according to a first embodiment, and FIG. 2 is a cross-sectional view of a housing 8 of a second unit 1B according to the first embodiment taken along a direction perpendicular to an axis.

The brake control apparatus 1 is usable for a hybrid automobile including an electric motor (a generator) in addition to an internal combustion engine, an electric automobile including only an electric motor, and the like, besides a general vehicle including only an internal combustion engine (an engine) as a prime mover that drives wheels. The brake control apparatus 1 is a hydraulic braking apparatus that applies a frictional braking force based on a hydraulic pressure to each of the wheels of the vehicle. A brake actuation unit is provided on each of the wheels. The brake actuation unit is, for example, a disk-type brake, and includes a wheel cylinder and a caliper. The caliper includes a brake disk and brake pads. The brake disk is a brake rotor that rotates integrally with a tire. The brake pads are disposed with predetermined clearances generated from the brake disk, and contact the brake disk by being moved by the hydraulic pressure in the wheel cylinder. By this operation, the brake actuation unit generates the frictional braking force. The brake control apparatus 1 includes two brake pipe systems (a primary P system and a secondary S system). The brake pipe configuration is, for example, the X-split pipe configuration. The brake control apparatus 1 may employ another pipe configuration, such as the front/rear split pipe configuration. Hereinafter, when a member provided in correspondence with the P system and a member provided in correspondence with the S system are distinguished from each other, indexes P and S will be added at the ends of the respective reference numerals. The brake control apparatus 1 supplies brake fluid working as hydraulic fluid (hydraulic liquid) to each of the brake actuation units via the brake pipes, and generates the hydraulic pressure (a brake hydraulic pressure) in the wheel cylinder. By this operation, the brake control apparatus 1 applies a hydraulic braking force to each of the wheels.

The brake control apparatus 1 includes a first unit 1A and a second unit 1B. The wheel cylinder on each of the wheels and the second unit 1B are connected to each other via a wheel cylinder pipe 10W. The first unit 1A and the second unit 1B are set up in, for example, an engine room isolated from a driving compartment of the vehicle, and are connected to each other via a plurality of pipes. The plurality of pipes includes master cylinder pipes 10M (a primary pipe 10MP and a secondary pipe 10MS), an intake pipe 10R, and a back-pressure pipe 10X. Except for the intake pipe 10R, each of the pipes 10M, 10W, and 10X is a metallic brake pipe (a metallic pipe), and, in particular, a steel tube such as a double-walled steel tube. The both end portions of each of the pipes 10M, 10W, and 10X each include a male pipe joint processed by flaring processing. The intake pipe 10R is a brake hose (a hose pipe) formed so as to become flexible from a material such as rubber. The end portions of the intake pipe 10R are connected to a port 873 and the like via nipples 10R1 and 10R2. The nipples 10R1 and 10R2 are each a resin connection member having a tubular portion. Hereinafter, a three-dimensional orthogonal coordinate system having an X axis, a Y axis, and a Z axis is set for convenience of the description. A Z-axis direction is defined to be the vertical direction and a Z-axis positive direction side is defined to be the upper side in the vertical direction with the first unit 1A and the second unit 1B mounted on the vehicle. An X-axis direction is defined to be the longitudinal direction of the vehicle and an X-axis positive direction side is defined to be the front side of the vehicle. A Y-axis direction is defined to be the lateral direction of the vehicle.

A push rod PR is rotatably connected to a brake pedal, which receives an input of a brake operation performed by a driver. The push rod PR extends from the end portion thereof on the X-axis negative direction side, which is connected to the brake pedal, toward the X-axis positive direction side. The first unit 1A is a brake operation unit mechanically connected to the brake pedal, and is a master cylinder unit including a master cylinder 5. The first unit 1A includes a reservoir tank 4, a housing 7, the master cylinder 5, a stroke sensor 94, and a stroke simulator 6. The reservoir tank 4 is a brake fluid source storing the brake fluid therein, and is a low-pressure portion opened to the atmospheric pressure. The housing 7 contains the master cylinder 5 and the stroke simulator 6 therein. A rectangular plate-like flange portion 78 is provided at the end portion of the housing 7 on the X-axis negative direction side. The four corners of the flange portion 78 are fixed to the dashboard on the vehicle body side with use of bolts B1. The reservoir tank 4 is set up on the Z-axis positive direction side of the housing 7. The master cylinder 5 is a first hydraulic pressure source capable of supplying the hydraulic pressure to the wheel cylinders, and is connected to the brake pedal via the push rod PR and is actuated according to the operation performed by the driver on the brake pedal. The stroke sensor 94 detects the stroke amount of a primary piston of the master cylinder 5. The stroke simulator 6 is actuated according to the brake operation performed by the driver, and provides a reaction force and a stroke to the brake pedal.

The second unit 1B is a hydraulic pressure control apparatus provided between the first unit 1A and the brake actuation unit of each of the wheels. The second unit 1B includes a housing 8, a motor 20, a pump 3, a plurality of electromagnetic valves and the like, a plurality of hydraulic pressure sensors and the like, and an electronic control unit (a control unit, hereinafter referred to as an ECU) 90. The housing 8 contains the pump 3 and the valve bodies of electromagnetic valves 21 and the like therein. The circuits (the brake hydraulic circuits) of the above-described two systems (the P system and the S system), through which the brake fluid flows, are formed by a plurality of fluid passages inside the housing 8. Further, a plurality of ports is formed inside the housing 8, and these ports are opened to the outer surface of the housing 8. The plurality of ports is connected to the fluid passages inside the housing 8, and connects these internal fluid passages and fluid passages (the pipes 10M and the like) outside the housing 8 to each other.

The motor 20 is a rotary electric motor, and includes a rotational shaft for driving the pump 3. The motor 20 may be a brushed motor or may be a brushless motor including a resolver that detects the rotational angle or the number of rotations of the rotational shaft. The pump 3 is a second hydraulic pressure source capable of supplying the hydraulic pressure to the wheel cylinders, and includes five pump portions 3A to 3E configured to be driven by the single motor 20. The pump 3 is used by the S system and the P system in common. The electromagnetic valves and the like are each an actuator that operates according to a control signal, and each include a solenoid and a valve body. The valve body is stroked according to electric power supply to the solenoid to switch the opening/closing of the fluid passage (establish or block the communication through the fluid passage). The electromagnetic valves and the like control the communication state of the above-described circuit to adjust the flow state of the brake fluid, thereby generating a control hydraulic pressure. The hydraulic pressure sensors and the like detect the discharge pressure of the pump 3 and the master cylinder hydraulic pressure.

The second unit 1B supplies the brake fluid pressurized by the pump 3 to the brake actuation units via the wheel cylinder pipes 10W, thereby generating the brake hydraulic pressures (the wheel cylinder hydraulic pressures). The second unit 1B can supply the master cylinder hydraulic pressure to each of the wheel cylinders, and can also control the hydraulic pressure in each of the wheel cylinders individually with use of the hydraulic pressure generated by the pump 3 independently of the brake operation performed by the driver with the communication blocked between the master cylinder 5 and the wheel cylinders. The ECU 90 receives inputs of the values detected by the stroke sensor 94, the hydraulic pressure sensors, and the like, and information regarding the running state from the vehicle side, and controls the opening/closing operations of the electromagnetic valves and the like and the number of rotations of the motor 20 (i.e., the discharge amount of the pump 3) based on a program installed therein, thereby controlling the wheel cylinder hydraulic pressure (the hydraulic braking force) at each of the wheels. By this control, the ECU 90 performs various kinds of brake control (anti-lock brake control for preventing a slip of a wheel due to braking, boosting control for reducing the brake operation force that the driver should input, brake control for controlling the motion of the vehicle, autonomous brake control such as preceding vehicle following control, regenerative cooperative brake control, and the like). The control of the motion of the vehicle includes vehicle behavior stabilization control such as electronic stability control. In the regenerative cooperative brake control, the ECU 90 controls the wheel cylinder hydraulic pressures so as to achieve a target deceleration (a target braking force) in cooperation with the regenerative brake.

Next, the housing 8 of the second unit 1B will be described.

The housing 8 is a generally cuboidal block formed with use of an aluminum alloy as a material thereof. The outer surface of the housing 8 includes a front surface 801, a back surface 802, a bottom surface 803, a top surface 804, a left side surface 805, and a right side surface 806. The front surface 801 (a first surface) is a flat surface relatively large in area. The back surface 802 (a second surface) is a flat surface generally in parallel with the front surface 801, and is located opposite (of the housing 8) from the front surface 801. The bottom surface 803 (a third surface) is a flat surface connected to the front surface 801 and the back surface 802. The top surface 804 (a fourth surface) is a flat surface generally in parallel with the bottom surface 803, and is located opposite (of the housing 8) from the bottom surface 803. The left side surface 805 (a fifth surface) is a flat surface connected to the front surface 801, the back surface 802, the bottom surface 803, and the top surface 804. The right side surface 806 (a sixth surface) is a flat surface generally in parallel with the left side surface 805, and is located opposite (of the housing 8) from the left side surface 805. The right side surface 806 is connected to the front surface 801, the back surface 802, the bottom surface 803, and the top surface 804. The front surface 801 is disposed on the Y-axis positive direction side and extends in parallel with the X axis and the Z axis with the housing 8 mounted on the vehicle. The back surface 802 is disposed on the Y-axis negative direction side, and extends in parallel with the X axis and the Z axis. The top surface 804 is disposed on the Z-axis positive direction side, and extends in parallel with the X axis and the Y axis. The bottom surface 803 is disposed on the Z-axis negative direction side, and extends in parallel with the X axis and the Y axis. The right side surface 806 is disposed on the X-axis positive direction side, and extends in parallel with the Y axis and the Z axis. The left side surface 805 is disposed on the X-axis negative direction side, and extends in parallel with the Y axis and the Z axis. In actual use, the layout of the housing 8 in the XY plane is not limited in any manner, and the housing 8 can be arranged in the XY plane at any position and in any orientation according to the vehicle layout and/or the like.

A recessed portion 80 is formed at each of the corner portions of the housing 8 on the front surface 801 side and the top surface 804 side. In other words, the vertex formed by the front surface 801, the top surface 804, and the right side surface 806, and the vertex formed by the front surface 801, the top surface 804, and the left side surface 805 have truncated shapes, and include first and second recessed portions 80A and 80B, respectively. The first recessed portion 80A is opened to the front surface 801, the top surface 804, and the left side surface 805. The second recessed portion 80B is opened to the front surface 801, the top surface 804, and the right side surface 806. The first recessed portion 80A includes a first flat surface portion 807, a second flat surface portion 808, and a third flat surface portion 809. The first flat surface portion 807 extends perpendicularly to the Y axis and in parallel with the XZ plane. The second flat surface portion 808 extends perpendicularly to the X axis and generally in parallel with the YZ plane. The third flat surface portion 809 extends in the Y-axis direction, and forms an angle of approximately 50 degrees with respect to the right side surface 806 in the counterclockwise direction as viewed from the Y-axis positive direction side. The second flat surface portion 808 and the third flat surface portion 809 are connected to each other smoothly via a concaved curved surface extending in the Y-axis direction. The second recessed portion 80B includes the first flat surface portion 807, the second flat surface portion 808, and the third flat surface portion 809. The third flat surface portion 809 extends in the Y-axis direction, and forms an angle of approximately 50 degrees with respect to the left side surface 805 in the clockwise direction as viewed from the Y-axis positive direction side. The other configuration of the second recessed portion 80B is similar to the first recessed portion 80A. The first and second recessed portions 80A and 80B are generally symmetric with respect to the YZ plane at the center of the housing 8 in the X-axis direction.

The housing 8 includes a cam containing hole (insertion hole) 81, a plurality of (five) cylinder containing holes 82A to 82E, a first fluid pool chamber 83, a second fluid pool chamber 84, a plurality of fixation holes 85, a plurality of valve containing holes, a plurality of sensor containing holes, an electric power source hole 86, a plurality of ports 87, the plurality of fluid passages, and the like. These holes and ports are formed with use of a drill or the like. The cam containing hole 81 has a bottomed cylindrical shape extending in the Y-axis direction, and is opened to the front surface 801. A central axis O of the cam containing hole 81 is disposed at a position of the front surface 801 that is approximately central in the X-axis direction and slightly offset from the center in the Z-axis direction toward the Z-axis negative direction side. The bottom surface 803 is positioned on the Z-axis negative direction side with respect to the central axis O, and the first recessed portion 80A and the second recessed portion 80B are positioned on the Z-axis positive direction side with respect to the central axis O.

Each of the cylinder containing holes 82 has a stepped cylindrical shape and has a central axis extending in the radial direction of the cam containing hole 81 (the radial direction around the central axis O). The hole 82 includes a small diameter portion 820 on one side closer to the cam containing hole 81, a large diameter portion 821 on the other side farther away from the cam containing hole 81, and an intermediate diameter portion 822 between the small diameter portion 820 and the large diameter portion 821. A part 823 of the intermediate diameter portion 822 on the one side closer to the cam containing hole 81 functions as an intake port, and the large diameter portion 821 functions as a discharge port. The plurality of holes 82A to 82E is disposed approximately evenly (at approximately even intervals) in the circumferential direction around the central axis O. An angle formed by the central axes of the holes 82 adjacent to each other in the circumferential direction around the central axis O is approximately 72 degrees (falls within a predetermined range including 72 degrees). The plurality of holes 82A to 82E is a single row along the Y-axis direction, and is disposed on the Y-axis positive direction side of the housing 8. In other words, the central axes of these holes 82A to 82E are located in the same plane a generally perpendicular to the central axis O. The plane a extends generally in parallel with the front surface 801 and the back surface 802 of the housing 8, and is located on a closer side to the front surface 801 side than to the back surface 802. The respective intake ports 823 of the holes 82A to 82E are connected to one another via a first communication fluid passage. The respective discharge ports 821 of the holes 82A to 82E are connected to one another via a second communication fluid passage.

Each of the holes 82A to 82E is disposed inside the housing 8 in the following manner. The hole 82A extends from the bottom surface 803 toward the Z-axis positive direction side. The hole 82B extends from a portion of the left side surface 805 that is positioned on the lower side in the Z-axis negative direction with respect to the central axis O to the X-axis positive direction side and the Z-axis positive direction side. The hole 82C extends from the first recessed portion 80A to the X-axis positive direction side and the Z-axis negative direction side. The hole 82D extends from the second recessed portion 80B to the X-axis negative direction side and the Z-axis negative direction side. The hole 82E extends from a portion of the right side surface 806 that is positioned on the lower side in the Z-axis negative direction with respect to the central axis O to the X-axis negative direction side and the Z-axis positive direction side. On the Z-axis negative direction side with respect to the central axis O, the hole 82A is positioned at approximately the same position in the X-axis direction as the central axis O, and the holes 82B and 82E are disposed on the both sides of the central axis O (the hole 82A) in the X-axis direction. On the Z-axis positive direction side with respect to the central axis O, the holes 82C and 82D are disposed on the both sides of the central axis O in the X-axis direction. The small diameter portion 820 of each of the holes 82A to 82E is opened to the inner peripheral surface of the cam containing hole 81. The end portion of the hole 82A on the large diameter portion 821 side is opened to a portion of the bottom surface 803 that is approximately central in the X-axis direction and located on the Y-axis positive direction side. The end portion of the hole 82B on the large diameter portion 821 side is opened to a portion of the left side surface 805 that is located on the Y-axis positive direction side and the Z-axis negative direction side. The end portion of the hole 82E on the large diameter portion 821 side is opened to a portion of the right side surface 806 that is located on the Y-axis positive direction side and the Z-axis negative direction side. The end portions of the holes 82C and 82D on the large diameter portion 821 sides are opened to the first and second recessed portions 80A and 80B, respectively. More specifically, more than half of the end portion on the large diameter portion 821 side is opened to the third flat surface portion 809, and the remaining portion thereof is opened to the second flat surface portion 808. The third flat surface portion 809 extends generally perpendicularly to the central axes of the holes 82C and 82D.

The first fluid pool chamber 83 has a bottomed cylindrical shape with the central axis thereof extending in the Z-axis direction. The first fluid pool chamber 83 is opened to a portion of the top surface 804 that is approximately central in the X-axis direction and offset toward the Y-axis positive direction, and is disposed from the top surface 804 into the housing 8. The first fluid pool chamber 83 (the bottom portion thereof on the Z-axis negative direction side) is disposed on the Z-axis positive direction side with respect to the intake port 823 of each of the cylinder containing holes 82. The first fluid pool chamber 83 is formed in a region between the cylinder containing holes 82C and 82D adjacent to each other in the circumferential direction around the central axis O on the Z-axis positive direction side with respect to the central axis O. The first fluid pool chamber 83, and the holes 82C and 82D partially overlap each other in the Y-axis direction (as viewed from the X-axis direction). The first fluid pool chamber 83 and the intake port 823 of each of the holes 82A to 82E are connected to each other via an intake fluid passage 12. The second fluid pool chamber 84 has a bottomed cylindrical shape with the central axis thereof extending in the Z-axis direction. The second fluid pool chamber 84 is opened to a portion of the bottom surface 803 that is located on the X-axis negative direction side and offset toward the Y-axis positive direction, and is disposed from the bottom surface 803 into the housing 8. The second fluid pool chamber 84 is formed in a region between the cylinder containing holes 82A and 82B adjacent to each other in the circumferential direction around the central axis O on the Z-axis negative direction side with respect to the central axis O. The cylinder containing hole 82A and the second fluid pool chamber 84 partially overlap each other in the Y-axis direction (as viewed from the X-axis direction). The cam containing hole 81 and the second fluid pool chamber 84 are connected to each other via a drain fluid passage 19. One end of the drain fluid passage 19 is opened to a portion on the inner peripheral surface of the cam containing hole 81 that is located on the Y-axis negative direction side and the Z-axis negative direction side, and the other end of the drain fluid passage 19 is opened to the outer peripheral edge of the bottom surface of the second fluid pool chamber 84 on the Z-axis positive direction side.

The plurality of valve containing holes each has a bottomed cylindrical shape, and extends in the Y-axis direction to be opened to the back surface 802. The plurality of valve containing holes is a single row along the Y-axis direction, and is disposed on the Y-axis negative direction side of the housing 8. The cylinder containing holes 82 and the valve containing holes are arranged along the Y-axis direction. The plurality of valve containing holes at least partially overlaps the cylinder containing holes 82 as viewed from the Y-axis direction. Most of the plurality of valve containing holes is contained in a circle connecting the ends of the plurality of cylinder containing holes 82 on the large diameter portion 821 sides (the other sides farther away from the central axis O). Alternatively, the outer periphery of this circle and the valve containing holes at least partially overlap each other. The valve portion of the electromagnetic valve is fitted and the valve body thereof is contained in each of the valve containing holes. The plurality of sensor containing holes each has a bottomed cylindrical shape with the central axis thereof extending in the Y-axis direction, and is opened to the back surface 802. A pressure-sensitive portion, such as the hydraulic pressure sensor, is contained in each of the sensor containing portions. The electric power source hole 86 has a cylindrical shape and extends through the housing 8 (between the front surface 801 and the back surface 802) in the Y-axis direction. The hole 86 is disposed at a position of the housing 8 that is approximately central in the X-axis direction and located on the Z-axis positive direction side. The hole 86 is disposed in a region between the cylinder containing holes 82C and 82D adjacent to each other.

The intake port 873 is an opening portion of the first fluid pool chamber 83 on the top surface 804, and is opened to the upper side in the vertical direction. The port 873 is opened to a portion of the top surface 804 that is located on the central side in the X-axis direction and offset to the Y-axis positive direction. The port 873 is disposed on the Z-axis positive direction side with respect to the intake port 823 of each of the cylinder containing holes 82A to 82E. The cylinder containing holes 82C and 82D sandwich the port 873 as viewed from the Y-axis direction. The openings of the cylinder containing holes 82C and 82D and the port 873 partially overlap each other in the Y-axis direction (as viewed from the X-axis direction). Master cylinder ports 871 each have a bottomed cylindrical shape having a central axis extending in the Y-axis direction, and are opened to a portion that is an end portion of the front surface 801 on the Z-axis positive direction side and is sandwiched between the recessed portions 80A and 80B. The primary port 871P is disposed on the X-axis positive direction side, and the secondary port 871S is disposed on the X-axis negative direction side. Both the ports 871P and 871S are arranged in the X-axis direction, and sandwich the first fluid pool chamber 83 in the X-axis direction (as viewed from the Y-axis direction). The ports 871P and 871S are sandwiched between the first fluid pool chamber 83 and the cylinder containing holes 82D and 82C, respectively, in the circumferential direction around the central axis O (as viewed from the Y-axis direction). Wheel cylinder ports 872 each have a bottomed cylindrical shape with the central axis thereof extending in the Z-axis direction, and are opened to the Y-axis negative direction side of the top surface 804 (a position closer to the back surface 802 than to the front surface 801). The ports 872 are arranged in one row in the X-axis direction. The two ports 872 of the P system are disposed on the X-axis positive direction side, and the two ports 872 of the S system are disposed on the X-axis negative direction side. The first fluid pool chamber 83 is disposed in a region surrounded by the master cylinder ports 871 and the wheel cylinder ports 872. The plurality of fluid passages and the like connect the ports 87, the fluid pool chambers 83 and 84, the cylinder containing holes 82, the valve containing holes, and the hydraulic pressure sensor containing holes to one another.

The plurality of fixation holes 85 includes bolt holes 851 to 853 for fixing the motor, bolt holes 854 to 857 for fixing the ECU, and a bolt hole 858 for fixing the housing. The bolt holes 851 to 853 each have a bottomed cylindrical shape with the central axis thereof extending in the Y-axis direction, and are opened to the front surface 801. The holes 851 to 853 are located on the Y-axis positive direction side of the housing 8, and partially overlap the cylinder containing holes 82 in the Y-axis direction. The holes 851 to 853 are provided at positions generally symmetric with respect to the central axis O of the cam containing hole 81. The respective distances from the central axis O to the holes 851 to 853 are approximately equal to one another. The holes 852 and 853 are located on the both sides of the central axis O in the X-axis direction, and on the Z-axis positive direction side with respect to the central axis O. The holes 852 and 853 are located adjacent to the cylinder containing holes 82C and 82D (the large diameter portions 821 thereof) and are also located adjacent to the third flat surface portions 809 of the recessed portions 80A and 80B on the side surface 805 and 806 sides with respect to the cylinder containing holes 82C and 82D (on the opposite sides of the cylinder containing holes 82 from the first fluid pool chamber 83), respectively. The hole 851 is located on the X-axis positive direction side with respect to the cylinder containing hole 82A, and on the Z-axis negative direction side with respect to the central axis O. The hole 851 is located adjacent to the cylinder containing hole 82A (the large diameter portion 821 thereof) and is also located adjacent to the bottom surface 803 on the opposite side of the cylinder containing hole 82A from the second fluid pool chamber 84. The bolt holes 854 to 857 each have a cylindrical shape with the central axis thereof extending in the Y-axis direction, and extend through the housing 8. The holes 854 and 855 are located on the bottom surface 803 side, and the holes 856 and 857 are located on the top surface 804 side. The holes 854 and 855 are positioned at the corner portions sandwiched between the bottom surface 803 and the side surfaces 806 and 805, and are opened to the front surface 801 and the back surface 802. The holes 856 and 857 are positioned at the corner portions sandwiched between the top surface 804 and the second flat surface portions 808 of the recessed portions 80 as viewed from the Y-axis direction, and are opened to the first flat surfaces 807 of the recessed portions 80 and the back surface 802. The hole 856 is located adjacent to the wheel cylinder port 872b and is sandwiched between the ports 872b and 872c in the X-axis direction. The hole 857 is located adjacent to the wheel cylinder port 872a and is sandwiched between the ports 872a and 872d. The bolt holes 858A and 858B are positioned on the Z-axis negative direction side with respect to the central axis O. The bolt holes 858A and 858B each have a bottomed cylindrical shape with the central axis thereof extending in the Y-axis direction, and are opened to the both ends of the front surface 801 in the X-axis direction. The holes 858A and 858B are located on the Y-axis positive direction side of the housing 8, and partially overlap the cylinder containing holes 82 in the Y-axis direction. The holes 858A and 858B are located adjacent to the side surfaces 805 and 806, and are sandwiched between the cylinder containing holes 82B and 82E and the bolt holes 855 and 854 in the Z-axis direction, respectively. The hole 858A on the X-axis negative direction side is sandwiched between the left side surface 805 and the second fluid pool chamber 84. The hole 858A is positioned on the opposite side of the vicinity of the central axis O from the primary port 871P. The hole 858B on the X-axis positive direction side is positioned on the opposite side of the vicinity of the central axis O from the secondary port 871S. The bolt hole 858C is positioned on the Z-axis negative direction side with respect to the central axis O. The hole 858C has a bottomed cylindrical shape with the central axis thereof extending in the X-axis direction, and is opened to an approximately central portion of the right side surface 806 in the Y-axis direction. The hole 858C is opened while being located adjacent to the corner portion sandwiched between the first flat surface portion 807 and the third flat surface portion 809 of the second recessed portion 80B as viewed from the X-axis direction. The hole 858C is positioned on the opposite side of the vicinity of the central axis O from the hole 858A.

The ECU 90 is disposed and attached on the back surface 802 of the housing 8. In other words, the ECU 90 is provided integrally with the housing 8. The ECU 90 includes a control board and a control unit housing 901. The control board controls the states of electric power supply to the motor 20 and the solenoids of the electromagnetic valves and the like. Various kinds of sensors that detect the motion state of the vehicle, such as an acceleration sensor that detects the acceleration of the vehicle, and an angular speed sensor that detects the angular speed (the yaw rate) of the vehicle, may be mounted on the control board. Further, a combination sensor (a combined sensor) formed by unitizing these sensors may be mounted on the control board. The control board is contained in the case 901. The case 901 is a cover member attached to the back surface 802 (the bolt holes 854 to 857) of the housing 8 with use of bolts b2. The back surface 802 functions as a case attachment surface. The bolt holes 854 to 857 function as a fixation portion for fixing the ECU 90 to the housing 8. The head portions of the bolts b2 are disposed on the front surface 801 side of the housing 8. The shaft portions of the bolts b2 extend through the bolt holes 854 to 857, and the male screws on the distal end sides of the shaft portions are threadably engaged with the female screws on the case 901 side. The case 901 is fixedly fastened to the back surface 802 of the housing 8 with the aid of the axial forces of the bolts b2. The head portions b21 of the bolts b2 protrude in the first recessed portion 80A and the second recessed portion 80B, respectively. The head portions b21 are contained inside the recessed portions 80 and do not protrude beyond the front surface 801 toward the Y-axis positive direction side.

The case 901 is a cover member made from a resin material, and includes a board containing portion 902 and a connector portion 903. The board containing portion 902 contains the control board and parts of the solenoids of the electromagnetic valves and the like (hereinafter referred to as the control board and the like). The control board is mounted in the board containing portion 902 generally in parallel with the back surface 802. The terminals of the solenoids of the electromagnetic valves and the like, the terminals of the hydraulic pressure sensors and the like, and the conductive member from the motor 20 protrude from the back surface 802. The above-described terminals and conductive member extend toward the Y-axis negative direction side to be connected to the control board. The connector portion 903 is disposed on the X-axis negative direction side of the board containing portion 902 with respect to the above-described terminals and conductive member, and protrudes toward the Y-axis positive direction side of the board containing portion 902. The connector portion 903 is disposed on the slightly outer side (the X-axis negative direction side) with respect to the left side surface 805 of the housing 8 as viewed from the Y-axis direction. Terminals of the connector portion 903 are exposed toward the Y-axis positive direction side, and also extend toward the Y-axis negative direction side to be connected to the control board. Each of the terminals of the connector portion 903 (which are exposed toward the Y-axis positive direction side) is connectable to an external apparatus or the stroke sensor 94 (hereinafter referred to as the external apparatus and the like). An electric connection is established between the external apparatus and the like and the control board (the ECU 90) by insertion of another connector connected to the external apparatus and the like into the connector portion 903 from the Y-axis positive direction side. Further, electric power is supplied from an external electric power source (a battery) to the control board via the connector portion 903. The conductive member functions as a connection portion that electrically connects the control board and the motor 20 to each other, and electric power is supplied from the control board to the motor 20 via the conductive member.

The motor 20 is disposed and a motor housing 200 is attached on the front surface 801 of the housing 8. The front surface 801 functions as a motor attachment surface. The bolt holes 851 to 853 function as a fixation portion for fixing the motor 20 to the housing 8. The motor 20 includes the motor housing 200. The motor housing 200 has a bottomed cylindrical shape, and contains a magnet as a stator, a rotor, and the like on the inner peripheral side thereof, assuming that the motor 20 is a brushed DC motor by way of example. The conductive member for electric power supply is connected to the rotor via a brush. The central axis (the rotational axis) of the rotational shaft of the motor 20 approximately coincides with the central axis O of the cam containing hole 81. A rotational driving shaft 300, which is the rotational shaft and the driving shaft of the pump 3, and a cam unit 30 are contained in the cam containing hole 81 (inside the housing 8). The rotational driving shaft 300 is the driving shaft of the pump 3. The rotational driving shaft 300 is fixedly coupled with the rotational shaft of the motor 20 in such a manner that the central axis thereof extends on an extension of the central axis of the rotational shaft of the motor 20, and is rotationally driven by the motor 20. The central axis of the rotational driving shaft 300 approximately coincides with the central axis O. The rotational driving shaft 300 rotates integrally with the rotational shaft of the motor 20 around the central axis O. The cam unit 30 is provided on the rotational driving shaft 300. The cam unit 30 includes a cam 301, a driving member 302, and a plurality of rolling elements 303. The cam 301 is a columnar eccentric cam, and has a central axis P eccentric with respect to the central axis O of the rotational driving shaft 300. The central axis P extends generally in parallel with the central axis O. The cam 301 swings while rotating around the central axis O integrally with the rotational driving shaft 300. The driving member 302 has a cylindrical shape, and is disposed on the outer peripheral side of the cam 301. The central axis of the driving member 302 approximately coincides with the central axis P. The driving member 302 is rotatable around the central axis P relative to the cam 301. The driving member 302 is configured similarly to an outer race of a rolling bearing. The plurality of rolling elements 303 is disposed between the outer peripheral surface of the cam 301 and the inner peripheral surface of the driving member 302. The rolling elements 303 are needle rollers, and extend along the direction of the central axis of the rotational driving shaft 300.

The pump 3 is a radial plunger pump in the form of a fixed cylinder, and includes the housing 8, the rotational driving shaft 300, the cam unit 30, and the plurality of (five) pump portions 3A to 3E. The pump portions 3A to 3E are each a plunger pump (a piston pump) as a reciprocating pump, and are actuated by the rotation of the rotational driving shaft 300. The brake fluid as the hydraulic fluid is sucked and discharged according to reciprocating movements of plungers 36. The cam unit 30 has a function of converting the rotational movement of the rotational driving shaft 300 into the reciprocating movements of the plungers 36. When the respective configurations of the pump portions 3A to 3E are distinguished from one another, indexes A to E are added to the reference numerals thereof. The respective plungers 36 are disposed around the cam unit 30, and are each contained in the cylinder containing hole 82. A central axis 360 of each of the plungers 36 approximately coincides with the central axis of the cylinder containing hole 82, and extends in the radial direction of the rotational driving shaft 300. In other words, the plungers 36 as many as the number of the cylinder containing holes 82 (five) are provided, and extend in the radial direction with respect to the central axis O. The plungers 36A to 36E are disposed approximately evenly in the circumferential direction around the rotational driving shaft 300, i.e., at approximately even intervals in the rotational direction of the rotational driving shaft 300. Central axes 360A to 360E of these plungers 36A to 36E are located in the same plane a. These plungers 36A to 36E are driven by the same rotational driving shaft 300 and the same cam unit 30.

Figure 3:
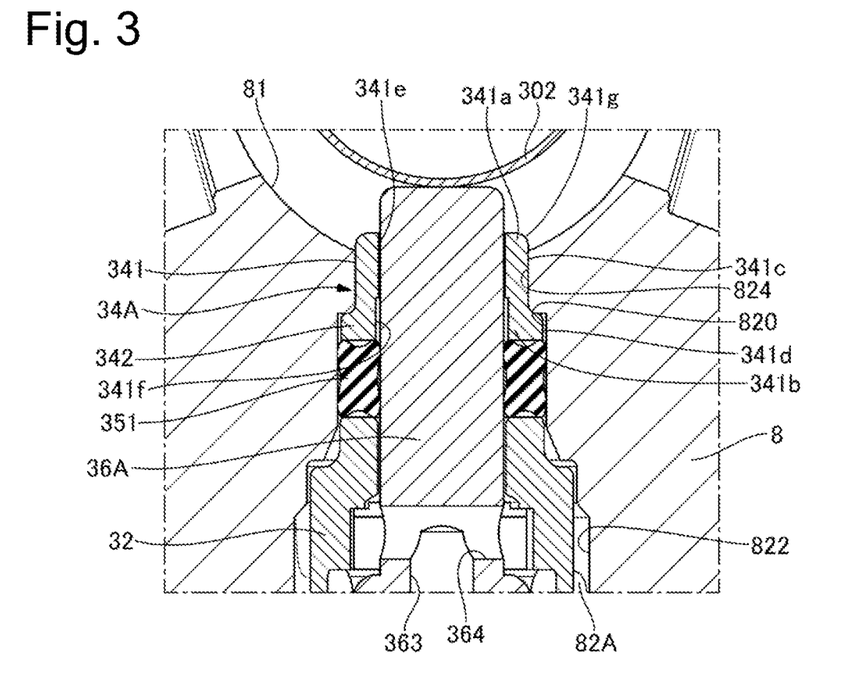
FIG. 3 is an enlarged view of main portions of a pump portion 3A according to the first embodiment.

The pump portion 3A includes a cylinder sleeve 31, a filter member 32, a plug member 33, a guide ring (a bearing) 34, a first seal ring 351, a second seal ring 352, the plunger 36, a return spring 37, an intake valve 38, and a discharge valve 39, and these components are set in the cylinder containing hole 82. The cylinder sleeve 31 has a bottomed cylindrical shape, and a hole 311 extends through a bottom portion 310 thereof. The cylinder sleeve 31 is fixed in the cylinder containing hole 82. The central axis of the cylinder sleeve 31 approximately coincides with the central axis 360 of the cylinder containing hole 82. An end portion 312 of the cylinder sleeve 31 on the opening side is disposed in the intermediate diameter portion 822 (the intake port 823), and the bottom portion 310 is disposed in the large diameter portion (discharge port) 821. The filter member 32 has a bottomed cylindrical shape, and a hole 321 extends through a bottom portion 320 thereof and a plurality of opening portions also extends through a side wall portion thereof. A filter is set on each of these opening portions. An end portion 323 of the filter member 32 on the opening side is fixed to the end portion 312 of the cylinder sleeve 31 on the opening side. The bottom portion 320 is disposed in the small diameter portion 820. The central axis of the filter member 32 approximately coincides with the central axis 360 of the cylinder containing hole 82. A gap is generated between the outer peripheral surface where the opening portion of the filter member 32 is opened and the inner peripheral surface of the cylinder containing hole 82 (the intake port 823). The first communication fluid passage is in communication with the intake port 823 and the above-described gap. The plug member 33 has a columnar shape, and includes a recessed portion 330 and a groove on one end side in the direction of the central axis thereof. This groove extends radially to connect the recessed portion 330 and the outer peripheral surface of the plug member 33 to each other, and is in communication with the discharge port 821. The above-described one end side of the plug member 33 in the axial direction is fixed to the bottom portion 310 of the cylinder sleeve 31. The central axis of the plug member 33 approximately coincides with the central axis 360 of the cylinder containing hole 82. The plug member 33 is fixed to the large diameter portion 821, and closes the opening of the cylinder containing hole 82 on the outer peripheral surface of the housing 8. The second communication fluid passage is in communication with the discharge port 821 and the above-described groove of the plug member 33. The guide ring 34 has a cylindrical shape, and is fixed on the cam containing hole 81 side (the small diameter portion 820) of the cylinder containing hole 82 with respect to the filter member 32. The guide ring 34 is made from a resin material. The central axis of the guide ring 34 approximately coincides with the central axis 360 of the cylinder containing hole 82. The first seal ring 351 is set between the guide ring 34 and the filter member 32 in the cylinder containing hole 82 (the small diameter portion 820).

The plunger 36 has a columnar shape, and includes an end surface (hereinafter referred to as a plunger end surface) 361 on one side in the direction of the central axis thereof and a flange portion 362 on the outer periphery on the other side in the direction of the central axis thereof. The plunger end surface 361 has a flat shape extending in a direction generally perpendicular to the central axis 360 of the plunger 36, and has a generally circular shape centered at the central axis 360. The plunger 36 includes an axial hole 363 and a radial hole 364 therein. The axial hole 363 extends on the central axis 360 to be opened to the end surface of the plunger 36 on the above-described other side in the direction of the central axis. The radial hole 364 extends in the radial direction of the plunger 36 to be opened to the outer peripheral surface on the above-described one side in the direction of the central axis with respect to the flange portion 362 and to be also connected to the above-described one side of the axial hole 363 in the direction of the central axis. A check valve case 365 is fixed at the end portion of the plunger 36 on the above-described other side in the direction of the central axis. The check valve case 365 has a bottomed cylindrical shape made of a thin plate, and includes a flange portion 366 on the outer periphery of the end portion thereof on the opening side and a plurality of holes 368 extending through a side wall portion and a bottom portion 367 thereof. The end portion of the check valve case 365 on the opening side is fitted to the end portion of the plunger 36 on the above-described other side in the direction of the central axis. The second seal ring 352 is set between the flange portion 366 of the check valve case 365 and the flange portion 362 of the plunger 36. The above-described other side of the plunger 36 in the direction of the central axis is inserted in the inner peripheral side of the cylinder sleeve 31, and the plunger portion 362 is guided and supported by the cylinder sleeve 31. The above-described one side of the plunger 36 in the direction of the central axis with respect to the radial hole 364 is inserted in the inner peripheral side (the hole 321) of the bottom portion 320 of the filter member 32, the inner peripheral side of the first seal ring 351, and the inner peripheral side of the guide ring 34, and is guided and supported by them. The central axis 360 of the plunger 36 approximately coincides with the central axis of the cylinder sleeve 31 and the like (the cylinder containing hole 82). The end portion of the plunger 36 on the above-describe one side in the direction of the central axis (the plunger end surface 361) protrudes inside the cam containing hole 81.

The return spring 37 is a compression coil spring, and is set on the inner peripheral side of the cylinder sleeve 31. One end and the other end of the return spring 37 are set on the bottom portion 310 of the cylinder sleeve 31 and the flange portion 366 of the check valve case 365, respectively. The return spring 37 constantly biases the plunger 36 toward the cam containing hole 81 side relative to the cylinder sleeve 31 (the cylinder containing hole 82). The intake valve 38 includes a ball 380 as a valve body and a return spring 381, and they are contained on the inner peripheral side of the check valve case 365. A valve seat 369 is provided around the opening of the axial hole 363 on the end surface of the plunger 36 on the above-described other side in the direction of the central axis. The ball 380 is seated on the valve seat 369, by which the axial hole 363 is closed. The return spring 381 is a compression coil spring, and one end and the other end thereof are set on the bottom portion 367 of the check valve case 365 and the ball 380, respectively. The return spring 381 constantly biases the ball 380 toward the valve seat 369 side relative to the check valve case 365 (the plunger 36). The discharge valve 39 includes a ball 390 as a valve body and a return spring 391, and they are contained in the recessed portion 330 of the plug member 33. A valve seat 313 is provided around the opening portion of the through-hole 311 on the bottom portion 310 of the cylinder sleeve 31. The ball 390 is seated on the valve seat 313, by which the through-hole 311 is closed. The return spring 391 is a compression coil spring, and one end and the other end thereof are set on the bottom surface of the recessed portion 330 and the ball 390, respectively. The return spring 391 constantly biases the ball 390 toward the valve seat 313 side.

Inside the cylinder containing hole 82, a space R1 on the cam containing hole 81 side with respect to the flange portion 362 of the plunger 36 is a space on the intake side in communication with the first communication fluid passage. More specifically, a space that functions as the intake-side space R1 extends from the above-described gap between the outer peripheral surface of the filter member 32 and the inner peripheral surface (the intake port 823) of the cylinder containing hole 82 through the plurality of openings of the filter member 32 and a gap between the outer peripheral surface of the plunger 36 and the inner peripheral surface of the filter member 32, and leads to the radial hole 364 and the axial hole 363 of the plunger 36. The communication of this intake-side space R1 with the cam containing hole 81 is blocked by the first seal ring 351. Inside the cylinder containing hole 82, a space R3 between the cylinder sleeve 31 and the plug member 33 is a discharge-side space in communication with the second communication fluid passage. More specifically, a space extending from the above-described groove of the plug member 33 to the discharge port 821 functions as the discharge-side space R3. On the inner peripheral side of the cylinder sleeve 31, the volume of a space R2 between the flange portion 362 of the plunger 36 and the bottom portion 310 of the cylinder sleeve 31 changes due to a reciprocating movement (a stroke) of the plunger 36 relative to the cylinder sleeve 31. This space R2 is in communication with the intake-side space R1 according to the opening of the intake valve 38, and is in communication with the discharge-side space R3 according to the opening of the discharge valve 39. The plunger 36 of the pump portion 3A exerts a pump function by reciprocating. More specifically, when the plunger 36 is stroked to one side approaching the cam containing hole 81 (the central axis O), the volume of the space R2 increases and the pressure in R2 reduces. According to the closing of the discharge valve 39 and the opening of the intake valve 38, the brake fluid as the hydraulic fluid is introduced from the intake-side space R1 to the space R2, and the brake fluid is supplied from the first communication fluid passage into the space R2 via the intake port 823. When the plunger 36 is stroked to the other side moving away from the cam containing hole 81, the volume of the space R2 reduces and the pressure in R2 increases. Due to the closing of the intake valve 38 and the opening of the discharge valve 39, the brake fluid is transmitted out of the space R2 into the discharge-side space R3, and the brake fluid is supplied into the second communication fluid passage via the discharge port 821. The other pump portions 3B to 3E are also configured in a similar manner. The brake fluid discharged to the second communication fluid passage by each of the pump portions 3A to 3E is collected into a single discharge fluid passage 13, and is used in common by the two hydraulic circuit systems.

Figure 4:
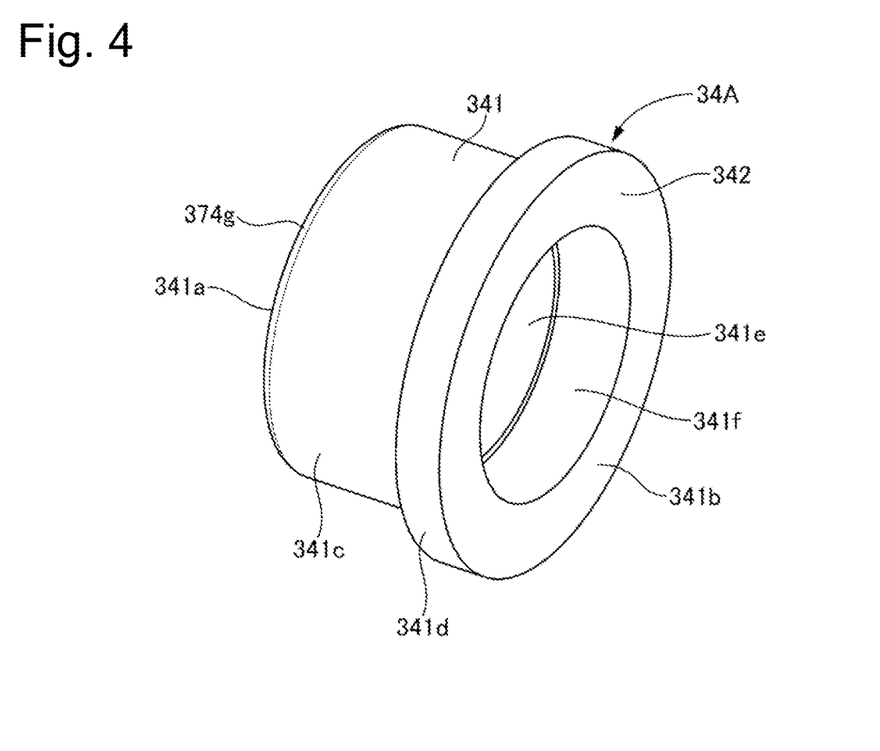
FIG. 4 is a perspective view of a guide ring 34A according to the first embodiment.
Figure 5:
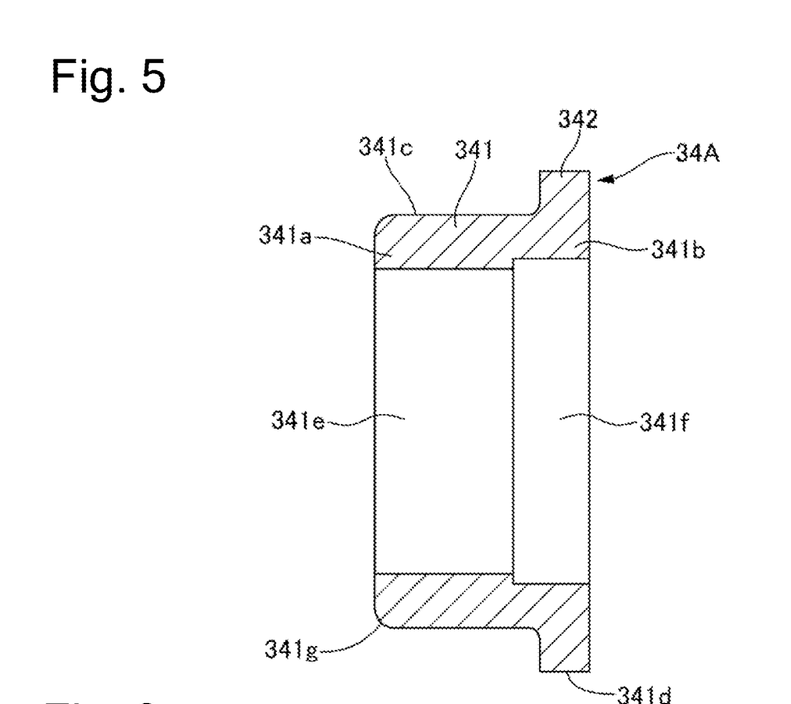
FIG. 5 is an axial cross-sectional view of the guide ring 34A according to the first embodiment.

FIG. 3 is an enlarged view of main portions of the pump portion 3A according to the first embodiment. FIG. 4 is a perspective view of the guide ring 34A according to the first embodiment. FIG. 5 is an axial cross-sectional view of the guide ring 34A according to the first embodiment.

The guide ring 34A includes a cylindrical portion 341 and a flange portion 342. The cylindrical portion 341 is cylindrically formed, and includes a first end portion 341a and a second end portion 341b at the both axial ends thereof. The guide ring 34A is fixed to the housing 8 with the first end portion 341a protruding in the cam containing hole 81. The flange portion 342 protrudes from the second end portion 341b of the cylindrical portion 341 radially outward. The outer periphery of the guide ring 34A except for the flange portion 342 is a small outer-diameter portion 341c. Further, the outer periphery of the flange portion 342 is a large outer-diameter portion 341d larger in outer diameter than the small outer-diameter portion 341c. A smallest diameter portion 824 smaller in inner diameter than the small diameter portion 820 is provided at a position of the cylinder containing hole 82A closer to the cam containing hole 81 than the small diameter portion 820 is. The cylindrical portion 341 of the guide ring 34A is press-fitted in the smallest diameter portion 824. The inner diameter of the small diameter portion 820 is larger than the outer diameter of the flange portion 342.

The cylindrical portion 341 includes a small inner-diameter portion 341e and a large inner-diameter portion 341f on the inner periphery thereof. The small inner-diameter portion 341e is disposed on the first end portion 341a side, and the large inner-diameter portion 341f is disposed on the second end portion 341b side. The large inner-diameter portion 341f is larger in inner diameter than the small inner-diameter portion 341e. Further, the axial length of the large inner-diameter portion 341f is set to longer than the stroke range of the plunger 36A. The first end portion 341a includes a R-shaped portion 341g on the outer periphery of the distal end thereof.

The guide rings 34B to 34E of the pump portions 3B to 3E do not protrude in the cam insertion hole 81. In other words, the distal ends of the guide rings 34B to 34E on the radially inner sides are located on the radially outer sides with respect to the inner peripheral surface of the cam containing hole 81.

Next, the functions will be described.

When the pump 3 is actuated, contamination such as wear debris is generated according to the sliding contact between each of the plungers 36A to 36E and the driving member 302. The contamination mixed with the brake fluid leaked from the cylinder containing holes 82A to 82E is deposited in the cam containing hole 81. Now, the cylinder containing hole 82A of the pump portion 3A, among these cylinder containing holes 82A to 82E, is opened upward at the lowest end of the cam containing hole 81. In other words, the pump portion 3A is positioned on the lower side in the vertical direction with respect to the center of the cam containing hole 81 when the brake control apparatus 1 is mounted on the vehicle. Therefore, the contamination deposited in the cam containing hole 81 enters a gap between the outer peripheral surface of the plunger 36A and the inner peripheral surface of the guide ring 34 according to the reciprocating sliding movement of the plunger 36A, and scars the plunger 36A. As a result, the scar (the unevenness) generated on the outer peripheral surface of the plunger 36A may damage the first seal ring 351, thereby resulting in a reduction in the durability of the pump portion 3A. Especially, the above-described problem noticeably arises with recent vehicles equipped with the autonomous driving function or the brake-by-wire system because the pump 3 is highly frequently actuated and the contamination is generated by a large amount on these vehicles.

To address this problem, in the brake control apparatus 1 according to the first embodiment, the guide ring 34A of the pump portion 3A protrudes in the cam containing hole 81. In other words, the guide ring 34A is fixed in the cylinder containing hole 82A in such a manner that the upper end thereof (the distal end of the first end portion 341a) is positioned in the cam containing hole 81 on the upper side with respect to the opening edge of the cylinder containing hole 82A. The contamination generated due to the actuation of the pump 3 is deposited on the outer peripheral side of the guide ring 34, but is isolated from the plunger 36A by the guide ring 34 and therefore can be less attached to the plunger 36A and less enter the inner peripheral side of the guide ring 34. As a result, the brake control apparatus 1 can prevent or reduce the scar on the plunger 36A by the contamination, thereby preventing or reducing the deterioration of the sealing performance of the first seal ring 351 and thus improving the durability of the pump portion 3A.

The guide ring 34A includes the small inner-diameter portion 341e and the large inner-diameter portion 341f on the inner periphery thereof. The small inner-diameter portion 341e and the large inner-diameter portion 341f are provided on the first end portion 341a side and the second end portion 341b side in the axial direction of the guide ring 34A, respectively, and the large inner-diameter portion 341f is larger in inner diameter than the small inner-diameter portion 341e. A gap between the large inner-diameter portion 341f and the plunger 36A is large compared to the small inner-diameter portion 341e, and therefore the outer peripheral surface of the plunger 36A is less likely scarred even when the contamination enters between the inner peripheral surface of the large inner-diameter portion 341f and the outer peripheral surface of the plunger 36A. More specifically, even when the plunger 36A slidably reciprocates with the contamination stuck between the inner peripheral surface of the guide ring 34 and the outer peripheral surface of the plunger 36A, the range where the plunger 36A is scarred can be limited to the range where the plunger 36A is in contact with the small inner-diameter portion 341e.

The axial length of the large inner-diameter portion 34f of the guide ring 34A is set to longer than the stroke range of the plunger 34A. Due to this setting, even when the plunger 36A slidably reciprocates with the contamination stuck in the gap between the small inner-diameter portion 341e and the plunger 36A and the outer peripheral surface of the plunger 36A is scarred, this scar does not reach the first seal ring 351 and therefore the first seal ring 351 can be prevented from being damaged.

The guide ring 34A includes the flange portion 342 on the outer periphery thereof and on the radially outer side of the large inner-diameter portion 341f. Due to this configuration, when the guide ring 34A is installed in the cylinder containing hole 82A, the flange portion 362 is brought into abutment with the stepped surface between the small diameter portion 820 and the smallest diameter portion 824, and this abutment allows the guide ring 34A to be positioned in the axial direction of the cylinder containing hole 82A with improved accuracy.

The guide ring 34A includes the small outer-diameter portion 341c on the outer periphery thereof. The small outer-diameter portion 341c is smaller in outer diameter than the flange portion 342. The small outer-diameter portion 341c is fixed to the housing 8 by being press-fitted to the smallest diameter portion 824 of the cylinder containing hole 82A. As a result, the guide ring 34A can be easily fixed to the housing 8.

The guide ring 34A includes the first end portion 341a and the second end portion 341b as the both axial end portions thereof. Then, the first end portion 341a, which is one of these end portions that is located on the cam containing hole 81 side, includes the R-shaped portion 341g, and the first end portion 341a is reducing in diameter toward the distal end thereof. Due to this configuration, the brake control apparatus 1 can facilitate the positioning at the initial stage of the press-fitting when the guide ring 34A is press-fitted into the cylinder containing hole 82A, thereby preventing or reducing biting at the time of the press-fitting. Further, the brake control apparatus 1 can prevent or reduce the deposition of the contamination on the end surface of the first end portion 341a.

Second Embodiment

A second embodiment has a basic configuration similar to the first embodiment, and therefore will be described focusing only on differences from the first embodiment.

Figure 6:
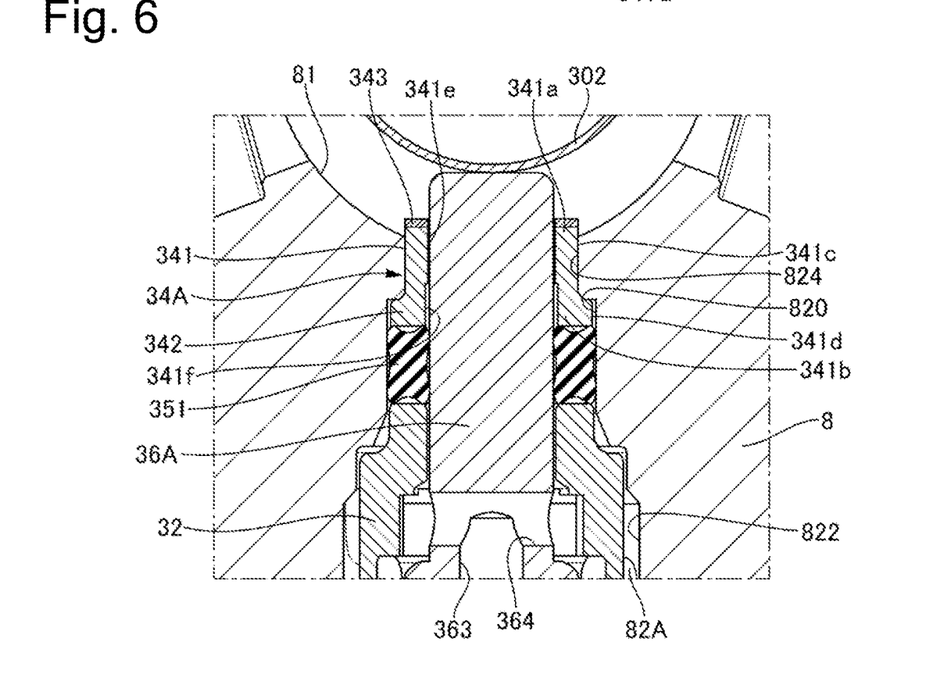
FIG. 6 is an enlarged view of main portions of the pump portion 3A according to a second embodiment.

FIG. 6 is an enlarged view of main portions of the pump portion 3A according to the second embodiment.

The pump portion 3A according to the second embodiment is different from the first embodiment in terms of the guide ring 34A including a seal member 343. The seal member 343 is annularly formed, and is fixed to the end surface of the first end portion 341a by adhesion in close contact with the outer peripheral surface of the plunger 36A. The first end portion 341a has a constant outer diameter.

In the second embodiment, the amount of the contamination entering the inner peripheral side of the guide ring 34A can be reduced by eliminating the gap between the inner peripheral surface of the guide ring 34A and the outer peripheral surface of the plunger 36A with use of the seal member 343.

Third Embodiment

A third embodiment has a basic configuration similar to the first embodiment, and therefore will be described focusing on only differences from the first embodiment.

Figure 7:
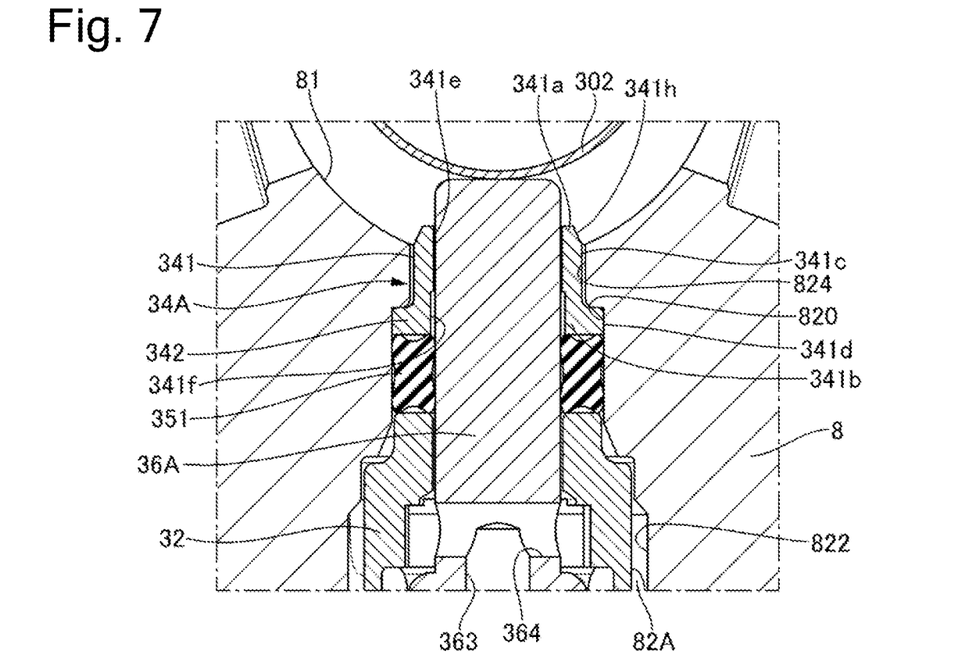
FIG. 7 is an axial cross-sectional view of the guide ring 34A according to a third embodiment.

FIG. 7 is an axial cross-sectional view of the guide ring 34A according to the third embodiment.

The guide ring 34A according to the third embodiment is different from the first embodiment in terms of the flange portion 342 press-fitted in the small diameter portion 820 of the cylinder containing hole 82A. The inner diameter of the smallest diameter portion 824 is larger than the outer diameter of the cylindrical portion 341. The first end portion 341a of the guide ring 34A includes a taper portion 341h on the outer periphery of the distal end thereof. The taper portion 341h is reducing in diameter toward the distal end thereof.

The guide ring 34A is a resin molded product, and therefore the inner diameter dimension of the press-fitted portion largely changes when the guide ring 34A is press-fitted in the cylinder containing hole 82A, compared to a metallic product. Further, there is a large variation in the dimension of the resin molded product compared to the metallic product. Therefore, in the case where the radially outer side of the small inner-diameter portion 341e in sliding contact with the plunger 36A is press-fitted in the cylinder containing hole 82A, the dimension of the small inner-diameter portion 341e should be designed in consideration of deformation due to the press-fitting and variations in the dimensions of the cylinder containing hole 82A and the small outer-diameter portion 341c. To address this inconvenience, in the third embodiment, the guide ring 34A is fixed to the housing 8 by press-fitting the radially outer side of the large inner-diameter portion 341f in the small diameter portion 820. Due to this configuration, the dimension of the small inner-diameter portion 341e can be designed without consideration of the deformation due to the press-fitting and the dimensional variation in each portion. In other words, the third embodiment allows the dimension of the small inner-diameter portion 341e to be set with high accuracy, thereby being able to further reduce the gap between the small inner-diameter portion 341e and the plunger 36A. As a result, the third embodiment can reduce the amount of the contamination entering the gap between the small inner-diameter portion 341e and the plunger 36A, and can also reduce the tilt of the plunger 36A, thereby achieving ideal actuation of the pump portion 3A.

The guide ring 34A includes the first end portion 341a and the second end portion 341b as the both axial end portions thereof. Then, the first end portion 341a, which is one of these end portions that is located on the cam containing hole 81 side, includes the taper portion 341h, and the first end portion 341a is reducing in diameter toward the distal end thereof. Due to this configuration, the third embodiment can facilitate the positioning at the initial stage of the press-fitting when the guide ring 34A is press-fitted into the cylinder containing hole 82A, thereby preventing or reducing biting at the time of the press-fitting. Further, the third embodiment can prevent or reduce the deposition of the contamination on the end surface of the first end portion 341a.

Fourth Embodiment

A fourth embodiment has a basic configuration similar to the third embodiment, and therefore will be described focusing on only differences from the third embodiment.

Figure 8:
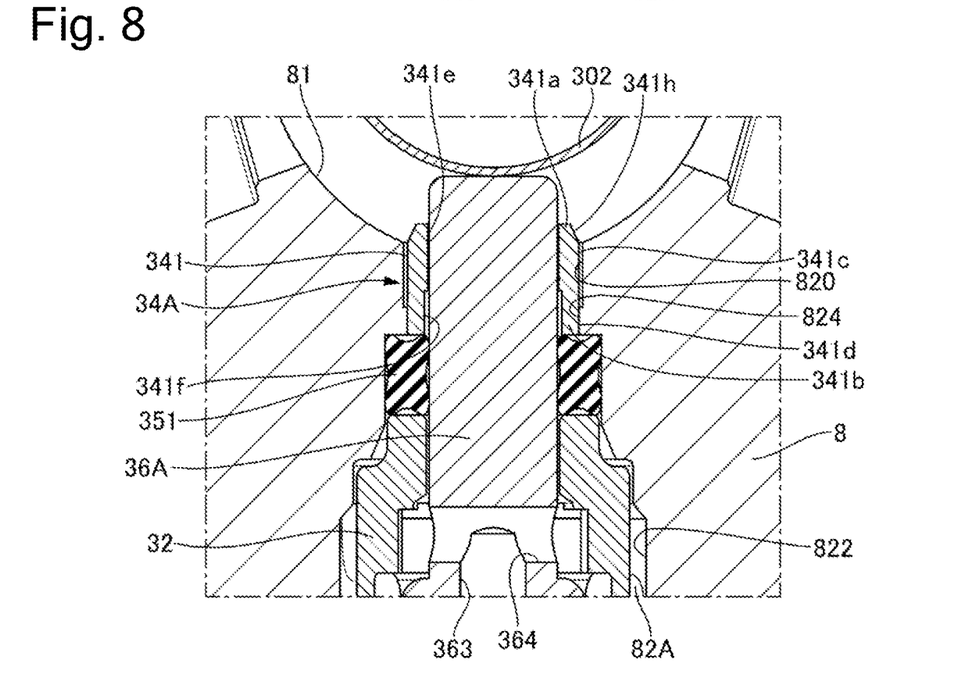
FIG. 8 is an axial cross-sectional view of the guide ring 34A according to a fourth embodiment.

FIG. 8 is an axial cross-sectional view of the guide ring 34A according to the fourth embodiment.

The guide ring 34A according to the fourth embodiment is different from the third embodiment in terms of omission of the flange portion. The outer diameter of the guide ring 34A is constant except for the taper portion 341h. The smallest diameter portion 824 of the cylinder containing hole 82A is provided between the small diameter portion 820 and the intermediate diameter portion 822. The guide ring 34A is press-fitted in the smallest diameter portion 824. The fourth embodiment can also bring about similar advantageous effects to the third embodiment.

Fifth Embodiment

A fifth embodiment has a basic configuration similar to the first embodiment, and therefore will be described focusing on only differences from the first embodiment.

Figure 9:
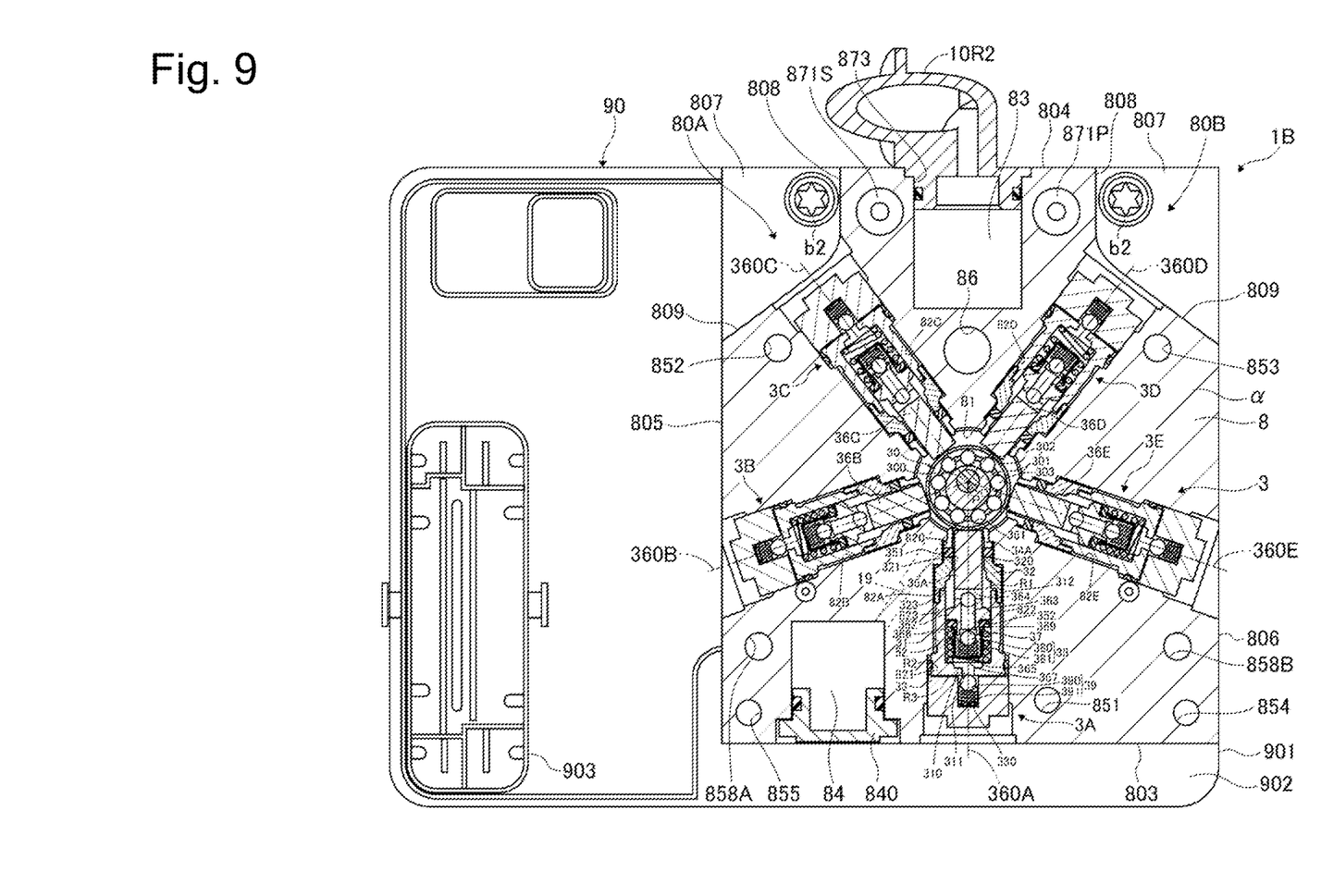
FIG. 9 is a cross-sectional view of the housing 8 of the second unit 1B according to a fifth embodiment taken along the direction perpendicular to the axis.

FIG. 9 is a cross-sectional view of the housing 8 of the second unit 1B according to the fifth embodiment taken along the direction perpendicular to the axis.

The fifth embodiment is different from the first embodiment in terms of employing the guide ring 34A according to the first embodiment for all of the pump portions 3A to 3E.

Mounting one type of guide ring as the guide ring 34A for all of the pump portions 3A to 3E allows the same mounting process to be employed therefor, thereby being able to prevent an error in the mounting and simplify the process.

Other Embodiments

Having described the embodiments for implementing the present invention, the specific configuration of the present invention is not limited to the configurations of the embodiments, and the present invention also includes even a design modification and the like thereof made within a range that does not depart from the spirit of the present invention, if any.

The guide ring 34 may be coplanar with the cam insertion hole 81.

In the fifth embodiment, the guide ring 34A according to the first embodiment may be employed for only the three pump portions 3A, 3B, and 3E.

In the following description, technical ideas recognizable from the above-described embodiments will be described.

A brake control apparatus, in one configuration thereof, includes a motor and a housing. The housing includes a first surface on which the motor is disposed, a second surface spaced apart from the first surface by a predetermined distance in a direction of a rotational axis of the motor, and an insertion hole extending from the first surface toward the second surface in the direction of the rotational axis and configured to receive insertion of a shaft that is rotated by the motor. The brake control apparatus further includes a plunger pump. The plunger pump includes a plunger configured to be actuated by a rotation of the motor. The plunger pump includes a bearing through which a plunger is inserted. The bearing is fixed to the housing so as to protrude in the insertion hole or be arranged coplanarly with the insertion hole.

According to a further preferable configuration, in the above-described configuration, the bearing includes a small inner-diameter portion and a large inner-diameter portion on an inner periphery thereof. The large inner-diameter portion has a larger inner diameter than the small inner-diameter portion.

According to another preferable configuration, in any of the above-described configurations, an axial length of the large inner-diameter portion is equal to or longer than a stroke range of the plunger.

According to further another preferable configuration, in any of the above-described configurations, a radially outer side of the large inner-diameter portion of the bearing is fixed to the housing.

According to further another preferable configuration, in any of the above-described configurations, the bearing includes a flange portion on an outer periphery thereof and on the radially outer side of the large inner-diameter portion.

According to further another preferable configuration, in any of the above-described configurations, the bearing includes a flange portion on an outer periphery thereof.

According to further another preferable configuration, in any of the above-described configurations, the bearing includes a small outer-diameter portion on the outer periphery thereof. The small outer-diameter portion has a smaller outer diameter than the flange portion. The small outer-diameter portion is fixed to the housing.

According to further another preferable configuration, in any of the above-described configurations, the bearing includes a small inner-diameter portion and a large inner-diameter portion on an inner periphery thereof. The small inner-diameter portion is positioned on a radially inner side of the small outer-diameter portion. The large inner-diameter portion is positioned on a radially inner side of the flange portion.

According to further another preferable configuration, in any of the above-described configurations, at an end portion of both axial end portions of the bearing that is located on one side closer to the insertion hole, a diameter thereof is reducing toward a distal end.

According to further another preferable configuration, in any of the above-described configurations, the end portion has a R-shape.

According to further another preferable configuration, in any of the above-described configurations, the end portion has a tapering shape.

According to further another preferable configuration, in any of the above-described configurations, the bearing includes a seal member at an end portion of both axial end portions thereof that is located on one side closer to the insertion hole.

According to further another preferable configuration, in any of the above-described configurations, the plunger pump is located on a lower side in a vertical direction with respect to a center of the insertion hole when the brake control apparatus is mounted on a vehicle.

According to further another preferable configuration, in any of the above-described configurations, the plunger pump includes a plurality of plunger pumps arranged around the rotational axis.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-155195 filed on Aug. 22, 2018. The entire disclosure of Japanese Patent Application No. 2018-155195 filed on Aug. 22, 2018 including the specification, the claims, the drawings, and the abstract is incorporated herein by reference in its entirety.

REFERENCE SIGN LIST

3A pump portion (plunger pump)
8 housing
20 motor
34A guide ring (bearing)
36 plunger
81 cam containing hole (insertion hole)
300 rotational driving shaft (shaft)
801 front surface (first surface)
802 back surface (second surface)

The invention claimed is:

1. A brake control apparatus comprising:
a motor;
a housing including a first surface on which the motor is disposed,
a second surface spaced apart from the first surface by a predetermined distance in a direction of a rotational axis of the motor, and an insertion hole extending from the first surface toward the second surface in the direction of the rotational axis and configured to receive insertion of a shaft that is rotated by the motor; and
a plunger pump including a plunger configured to be actuated by a rotation of the motor, and a bearing through which the plunger is inserted, the bearing being fixed to the housing so as to protrude in the insertion hole or be arranged coplanarly with the insertion hole,
wherein the bearing includes a small inner-diameter portion and a large inner-diameter portion on an inner periphery thereof, the large inner-diameter portion having a larger inner diameter than the small inner-diameter portion.

2. The brake control apparatus according to claim 1, wherein an axial length of the large inner-diameter portion is equal to or longer than a stroke range of the plunger.

3. The brake control apparatus according to claim 1, wherein a radially outer side of the large inner-diameter portion of the bearing is fixed to the housing.

4. The brake control apparatus according to claim 3, wherein the bearing includes a flange portion on an outer periphery thereof and on the radially outer side of the large inner-diameter portion.

5. The brake control apparatus according to claim 1, wherein the bearing includes a flange portion on an outer periphery thereof.

6. The brake control apparatus according to claim 5, wherein the bearing includes a small outer-diameter portion on the outer periphery thereof, the small outer-diameter portion having a smaller outer diameter than the flange portion, and
wherein the small outer-diameter portion is fixed to the housing.

7. The brake control apparatus according to claim 6, wherein the bearing includes a small inner-diameter portion and a large inner-diameter portion on an inner periphery thereof, the small inner-diameter portion being positioned on a radially inner side of the small outer-diameter portion, the large inner-diameter portion being positioned on a radially inner side of the flange portion.

8. The brake control apparatus according to claim 1, wherein, at an end portion of both axial end portions of the bearing that is located on one side closer to the insertion hole, a diameter thereof is reducing toward a distal end.

9. The brake control apparatus according to claim 8, wherein the end portion has a R-shape.

10. The brake control apparatus according to claim 8, wherein the end portion has a tapering shape.

11. The brake control apparatus according to claim 1, wherein the bearing includes a seal member at an end portion of both axial end portions thereof that is located on one side closer to the insertion hole.

12. The brake control apparatus according to claim 1, wherein the plunger pump is located on a lower side in a vertical direction with respect to a center of the insertion hole when the brake control apparatus is mounted on a vehicle.

13. The brake control apparatus according to claim 1, wherein the plunger pump includes a plurality of plunger pumps arranged around the rotational axis.

14. A brake control apparatus comprising:
a motor;
a housing including a first surface on which the motor is disposed,
a second surface spaced apart from the first surface by a predetermined distance in a direction of a rotational axis of the motor, and an insertion hole extending from the first surface toward the second surface in the direction of the rotational axis and configured to receive insertion of a shaft that is rotated by the motor; and
a plunger pump including a plunger configured to be actuated by a rotation of the motor, and a bearing through which the plunger is inserted, the bearing being fixed to the housing so as to protrude in the insertion hole or to be arranged coplanarly with the insertion hole,
wherein the bearing includes a flange portion on an outer periphery thereof,
wherein the bearing includes a small outer-diameter portion on the outer periphery thereof, the small outer-diameter portion having a smaller outer diameter than the flange portion,
wherein the small outer-diameter portion is fixed to the housing, and
wherein the bearing includes a small inner-diameter portion and a large inner-diameter portion on an inner periphery thereof, the small inner-diameter portion being positioned on a radially inner side of the small outer-diameter portion, the large inner-diameter portion being positioned on a radially inner side of the flange portion.

* * * * *